United States Patent [19]

Bower et al.

[11] Patent Number: 5,656,817

[45] Date of Patent: Aug. 12, 1997

[54] RADIOACTIVE ION DETECTOR

[75] Inventors: Kenneth E. Bower, Los Alamos, N. Mex.; Donald R. Weeks, Saratoga, Calif.

[73] Assignee: The Reents of the University of California, Oakland, Calif.

[21] Appl. No.: 608,345

[22] Filed: Feb. 28, 1996

[51] Int. Cl.$^6$ .................................................... G01T 1/20
[52] U.S. Cl. .................................. 250/370.02; 250/361 R
[58] Field of Search ....................... 250/370.02, 370.03, 250/361 R, 362, 364, 432 R

[56] References Cited

U.S. PATENT DOCUMENTS

| | | | |
|---|---|---|---|
| 4,127,499 | 11/1978 | Chen et al. | 252/301.17 |
| 5,276,332 | 1/1994 | Marteau et al. | 250/432 R |
| 5,466,930 | 11/1995 | Schlenoff | 250/252.1 |

OTHER PUBLICATIONS

Ming Li and Joseph B. Schlenoff, Ion Exchange Using a Scintillating Polymer with a Charged Surface, 1994, Tallahassee, Florida.

Copy of Advertising Brochure prepared by Quantrad Sensor, "Quantrad System 100 Liquid Analyzer for High-Resolution Alpha Spectroscopy", undated, Santa Clara, CA.

*Primary Examiner*—David P. Porta
*Assistant Examiner*—Richard Hanig
*Attorney, Agent, or Firm*—Milton D. Wyrick; William A. Eklund

[57] ABSTRACT

Apparatus for detecting the presence, in aqueous media, of substances which emit alpha and/or beta radiation and determining the oxidation state of these radioactive substances, that is, whether they are in cationic or anionic form. In one embodiment, a sensor assembly has two elements, one comprised of an ion-exchange material which binds cations and the other comprised of an ion-exchange material which binds anions. Each ion-exchange element is further comprised of a scintillation plastic and a photocurrent generator. When a radioactive substance to which the sensor is exposed binds to either element and emits alpha or beta particles, photons produced in the scintillation plastic illuminate the photocurrent generator of that element. Sensing apparatus senses generator output and thereby indicates whether cationic species or anionic species or both are present and also provides an indication of species quantity.

7 Claims, 1 Drawing Sheet

1

RADIOACTIVE ION DETECTOR

FIELD OF THE INVENTION

This invention relates to the fields of chemistry and detection of radioactive substances.

This invention was made with government support under Contract No. W-7405-ENG-36 awarded by the U.S. Department of Energy. The government has certain rights in the invention.

BACKGROUND OF THE INVENTION

Radioactive substances are both naturally-occurring and found in the environment as a result of activities of man. An example of natural radioactivity is that due to uranium 238, which has been found in drinking water supplies in amounts which may be injurious to man. A good deal of effort is now being expended to clean up radiological contamination of the environment. The first step in dealing with environmental radioisotopes is, of course, to learn where they are located by collecting samples. When samples of water are collected from streams, wells, and surface water accumulations for the purpose of determining whether the water contains radioactive materials, the samples are immediately acidified. It is necessary to add acid (usually hydrochloric acid or, in some cases, nitric acid) in order to keep heavy metals in solution and prevent the metals from binding to the sample container, thus converting all metal ions to cations prior to analysis of the samples in a laboratory. Acidification causes loss of information on the chemical form of the radioactive substance in the environment, that is, whether the substance is in cationic or anionic form. The present invention provides a radiation detector which may be used to determine whether an aqueous sample contains alpha and/or beta radiation emitting substances and, if so, whether they are in cationic or anionic form at the time the sample is collected, that is, before it is acidified and information on oxidation states of the substance is lost. The invention utilizes a sensing element comprised of a single polymer matrix which serves to concentrate radioactive ions, to convert decay particles to photons, and to provide a durable mechanical barrier for the photon measuring device.

It is desirable to check samples in the field to determine if they are sufficiently radioactive that they require special handling. This invention provides semi-quantitative information on radioactive substances. A detector of this invention will be useful in obtaining information for choosing analytical procedures for laboratory analysis of samples.

Drinking water is usually slightly alkaline. Thus, a detector based on cation capture will miss the uranyltricarbonate anion, which is often found in the environment. On the other hand, a commonly used fluorescence-based detector will see only uranium (VI) anions and miss other radioactive ions. This invention may be used to monitor cations and anions simultaneously. A detector may be mounted in a drinking water pipeline for the purpose of providing an alarm signal upon detection of pre-set levels of radiological contaminants in the water. If the water is passed through a bed of ion-exchange material, a detector downstream of the bed may be used to signal when regeneration or replacement of the bed material is necessary. Another mode of using this invention is to lower it down a well to detect radioactivity in ground water.

BRIEF SUMMARY OF THE INVENTION

This invention is apparatus for detecting the presence, in aqueous media, of substances which emit alpha and/or beta radiation and determining the oxidation state of these radioactive substances, that is, whether they are in cationic or anionic form. In one embodiment, a sensor assembly has two elements, one comprised of an ion-exchange material which binds cations and the other comprised of an ion-exchange material which binds anions. Each ion-exchange element is further comprised of a scintillation plastic and a photocurrent generator. When a radioactive substance to which the sensor is exposed binds to either element and emits alpha or beta particles, photons produced in the scintillation plastic illuminate the photocurrent generator of that element. Sensing apparatus senses generator output and thereby indicates whether cationic species or anionic species or both are present and also provides an indication of species quantity.

In one embodiment, the invention is apparatus for detection of alpha and beta radiation comprising a solar cell having a photon-receiving surface and a back surface, where a first electrode is disposed on said photon-receiving surface and a second electrode is disposed on said back surface, and where a current lead is attached to each of said electrodes; a film comprised of optically clear ion-exchanging material covering the photon-receiving surface, where said ion film contains at least one species of scintillation fluor, and where the ion film and said solar cell comprise a sensing element; and a housing containing said sensing element, where at least a portion of the ion film is exposed to the atmosphere.

In another embodiment, the invention is apparatus for detection of alpha and beta radiation and determination of the oxidation state of alpha-emitting and beta-emitting ions, said apparatus comprising a first solar cell having a first photon-receiving surface and a back surface, where a first electrode is disposed on said first photon-receiving surface and a second electrode is disposed on said back surface, and where a current lead is attached to each of said electrodes; a film comprised of optically clear cation-exchanging material covering the first photon-receiving surface, where said cation film contains at least one species of scintillation fluor, and where the cation film and said first solar cell comprise a cation element; a second solar cell having a second photon-receiving surface and a back surface, where a third electrode is disposed on said second photon-receiving surface and a fourth electrode is disposed on said back surface, and where a current lead is attached to each of said electrodes; a film comprised of optically clear anion-exchanging material covering the second photon-receiving surface, where said anion film contains at least one species of scintillation fluor, and where the anion film and said second solar cell comprise an anion element; a sensing assembly comprised of said cation element, said anion element, and a light barrier which separates them, where the back surfaces of the elements are adjacent to the light barrier; and a housing containing said sensing assembly, where at least a portion of the cation film and at least a portion of the anion film are exposed to the atmosphere.

It is an object of this invention to provide a radiation detector which is capable of determining the oxidation state of an alpha-or beta-emitting ion.

Another object of this invention is to provide an inexpensive radiation sensor which can be discarded after a single use.

Another object is to provide an inexpensive device for determining, in the field, whether a sample requires special handling because it is radioactive.

A further object of this invention is to provide apparatus for rapid determination of oxidation state of radioactive ions in order to choose appropriate procedures for laboratory analysis of the sample containing the ions.

Still another object is to provide a monitor for use downstream of ion-exchange beds to determine when the beds require regeneration or replacement.

DETAILED DESCRIPTION OF THE INVENTION

Figure 1:
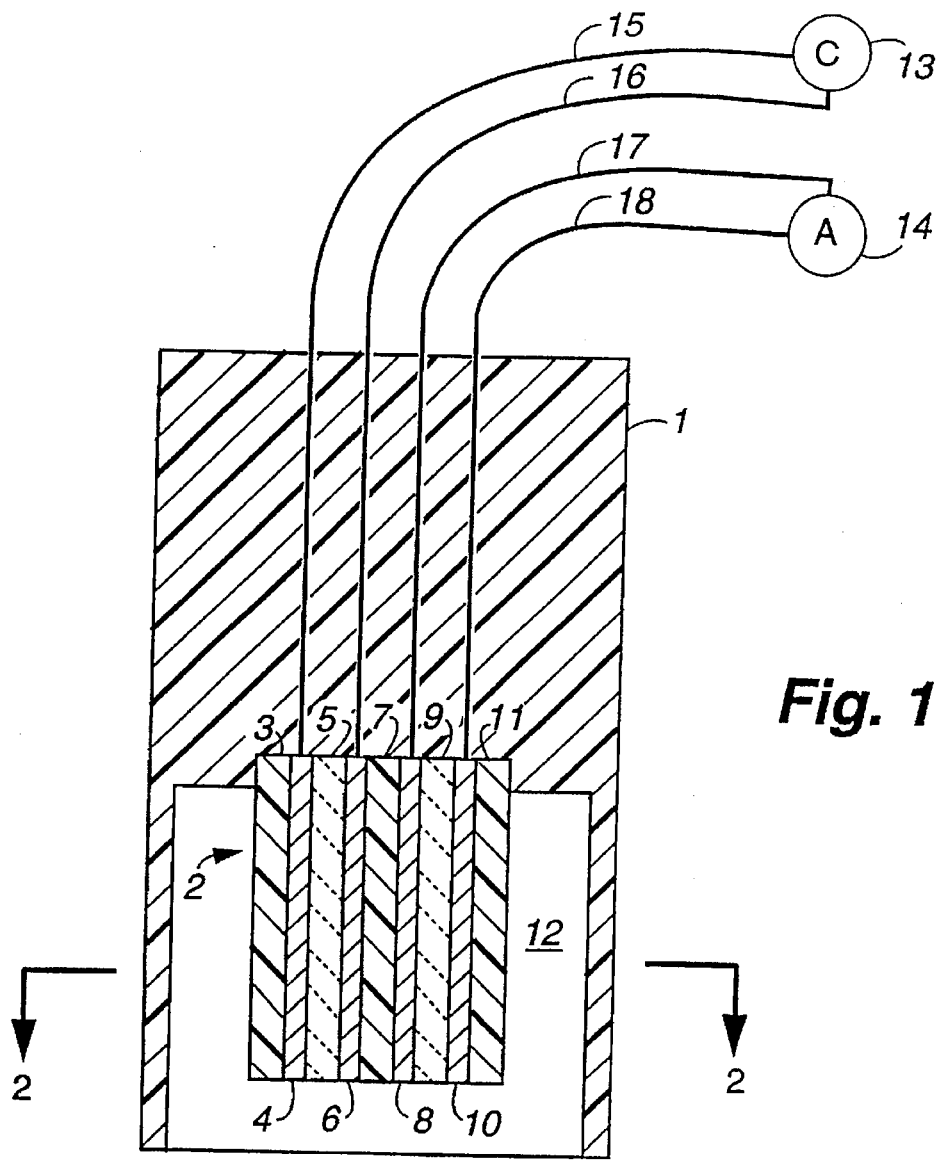
FIG. 1 depicts a detector in vertical section. It is not to scale.
Figure 2:
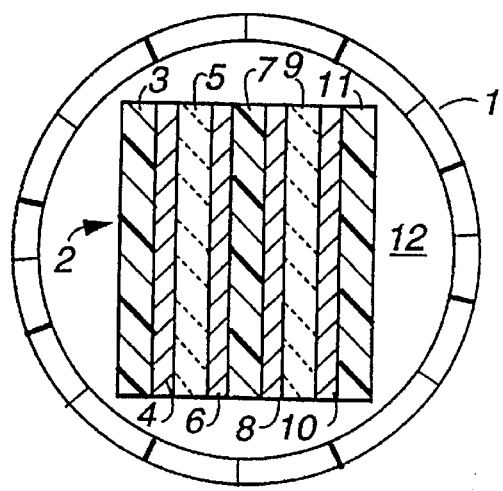
FIG. 2 is a section view taken as shown by the section arrows of FIG. 1.

FIGS. 1 and 2 depict an embodiment of the invention. As indicated below, the invention is not limited to this embodiment. Housing 1 contains a sensing assembly 2, which consists of cation film 3, electrode 4, photocurrent generator 5, electrode 6, light barrier 7, electrode 8, photocurrent generator 9, electrode 10, and anion film 11. Electrode 4 is disposed on a photon-receiving surface of photocurrent generator 5 and wire, or current lead, 15 connects electrode 4 to cation meter 13. Electrode 6 is disposed on the back surface of photocurrent generator 5 which is opposite to the photon-receiving surface. Wire 16 connects electrode 6 to cation meter 13. Electrode 1D is disposed on a photon-receiving surface of photocurrent generator 9 and wire 18 connects electrode 10 to anion meter 14. Electrode 8 is disposed on the back surface of photocurrent generator 9 opposite to the photon-receiving surface. Wire 17 connects electrode 8 to anion meter 14. Electrodes 6 and 8 may be in the form of thin films which entirely cover the back surfaces of the photocurrent generators or may cover only a portion of each surface. Electrodes 4 and 10 must be disposed on the photon-receiving surfaces in such manner as not to prevent photons from striking the photon-receiving surfaces in numbers effective to obtain readings from meters 13 and 14.

Cation film 3 is comprised of an optically clear cation-exchanging material 15 and covers the photon-receiving surface of photocurrent generator 5 to form, in combination with the generator, a cation element. Similarly, anion film 11 is comprised of an optically clear anion-exchanging material and covers the photon-receiving surface of photocurrent generator 9 to form, in combination with the generator, an anion element. Each ion-exchanging material contains at least one fluorescent dye, termed a fluor, which is capable of emitting light in response to radiation. Such light emission is known as scintillation and the films may be termed scintillation media. The back surfaces of the cation element and anion element (with electrodes disposed thereon) are separated from one another by light barrier 7, which serves the purpose of isolating the photocurrent generators from one another so that photons emitted from fluors in the cation film do not register on the photon-receiving surface of the anion element and photons emitted from fluors in the anion film do not register on the photon-receiving surface of the cation element. The light barrier may be an optically opaque electrically non-conductive plastic or may be a metal, in which case it will serve to replace electrodes 6 and 8, as well as function as a light barrier. If a light barrier is of metal, only one wire must be provided to connect with the ground terminals of both the cation meter and anion meter.

Sensing assembly 2 is held within housing 1, which is preferably of a non-conductive plastic suitable for the environment in which the invention will be used. The components of the sensor may be held together by any convenient mechanical means, such as by features of the housing, or they may be formed into assembly 2 by use of an appropriate adhesive. The assembly is fixed in the housing by any convenient means. The housing may be of any configuration suitable for the application in which the detector is used; it is not intended that the invention be limited to the housing of FIGS. 1 and 2. Housing 1 is intended to provide physical protection for sensing element 2 and to permit at least portions of surfaces of cation film 3 and anion film 11 to be exposed to the atmosphere so that these surfaces may be brought into contact with liquids containing radioactive substances. The photocurrent detectors of this invention are somewhat fragile. In one application of the invention, housing 1 is dipped into a liquid such that the liquid fills the cavity 12 within the lower end of the housing, thereby contacting the cation film and the anion film. In another application, a detector having a housing adapted for mounting in a pipeline is used to monitor radiological contamination of aqueous media flowing in the pipeline.

The sensing element is exposed to an aqueous solution containing cations and/or anions which bind to the ion-exchanging materials of the cation film and the anion film. When a radioactive cation binds to the cation film or a radioactive anion binds to the anion film and such ion emits an alpha particle (which is a helium nucleus with a charge of plus 2) or a beta particle (which is an electron), it is likely that the particle will impinge on or pass sufficiently close to a molecule of a fluor to excite the fluor and cause it to emit light. This light illuminates the photon-receiving surface of one of the photocurrent generators, causing a small electrical current to flow in each circuit comprised of electrodes, wires, and a meter. The magnitude of the current (or the voltage) is an indication of the quantity of alpha or beta radiation emitted and, therefore, of the concentration of radioactive materials in the aqueous media to which the sensing element is exposed. Alpha and beta particles have short penetration lengths, that is, they travel only a short distance from the ions which emit them. For this reason, it is necessary that the emitters be in close proximity to the fluors. This is accomplished by use of the cation film and anion film of this invention, each of which is comprised of an ion-exchanging material and at least one fluor. In order to detect a decay event, the kinetic energy released by the event must be deposited in the scintillation medium. Generally, decay events occurring in the solution will not result in disposition of energy in the media. While ion decay events which occur very close to a sensing element may register on it, in order to achieve a practical detector, it is necessary that the ions emitting the weakly penetrating radiation be bound to the element. Also, the particle-emitting ions depositing energy in the scintillation medium must be present in sufficient numbers that their decay events are not lost in background noise. Concentration of ions on a sensing element by means of its ion-exchange properties achieve this. More than one fluor may be used: a primary fluor will respond to an alpha or beta particle by fluorescing at a particular wavelength and a secondary fluor will respond to emissions of the primary fluor by fluorescing at a second wavelength, thus emitting photons which will more efficiently illuminate a photocurrent generator. Suitable primary fluors include diphenyloxazole (PPO), naphthalene, 1,3,5-triphenyl-2-pyrazoline, and p-terphenyl. Waveshifters, or secondary fluors, include phenylenebis(5-phenyloxazole) (POPOP), diphenyl stilbene, and 1,3,5-triaryl-2-pyrazoline. The most important considerations for choosing the primary and secondary fluors are the combinations which will most efficiently convert the high kinetic energy of the impinging radiation to the low bandgap energy of the photovoltaic. Since typical bandgaps of 1.2–1.4 eV can be efficiently used to measure photons in the 3 eV range, the absorption and emission maxima of POPOP and PPO are preferred. The required concentration of fluors in a scintillation plastic will usually be the range of 1–2%.

It is expected that radioactive ion concentrations of from about 50 to about 1,000 disintegrations per second will be capable of measurement. In the foregoing description, the term "meter" is intended to refer to any apparatus for measuring output of the photocurrent generators. Such apparatus will require means for eliminating, or zeroing out, background radiation. The concentration of radioactive ions in a solution is proportional to the number of photons produced in the scintillation plastic and, therefore, is also proportional to photocurrent detector output. Detectors may be calibrated by use of a solution of radioactive ions of known concentration. After a sensor has been used to take a measurement, it may be prepared for re-use, or regenerated, by exposing it to an appropriate acidic solution.

The photocurrent generators used in this invention are commonly known as solid state solar cells, or photodiodes. They are commercially available for as little as one dollar or less apiece. Since the cost is low, it is anticipated that these detectors may be used only once and then discarded. Such a solar cell is comprised of a wafer of p-type silicon on which a layer of n-type silicon is formed, thereby forming a pin junction. When photons which have energies in an appropriate range impinge on the n side of the solar cell (the photon-receiving surface), voltage and current are generated. Among references which may be consulted for more information on solar cells are U.S. Pat. No. 3,928,865, issued Dec. 23, 1975, and U.S. Pat. No. 4,001,864, issued Jan. 4, 1977.

Cation films and anion films may be formed on solar cells by dipping a solar cell in a liquid polymeric mixture, by spreading such mixture on the photo-receiving surface of a solar cell, or by spin coating the cell, which forms a particularly uniform film. The mixture is then dried or solidified to form the film. The back side of a solar cell may be coated with a polymer during production of a sensing element; this does not interfere with operation of the apparatus (as long as the electrode is in contact with the back side). A film must be insoluble in the aqueous solutions to which it will be exposed in use. Also, a film must be comprised of an optically clear polymer, that is, it must be transparent to photons emitted by flours. Examples of suitable polymers are polystyrene and polyvinyl toluene. The polymer must have ion-exchange properties, that is, it must be capable of binding cations or anions of radioactive substances which will be encountered in use. One method of making a liquid polymer mixture is to mix suitable monomers, fluors, polymerization initiators, and crosslink agents in a solvent, coat the solar cell with the solution, and initiate polymerization. The monomers or co-monomers can be chosen such that the polymer which is formed has the desired covalently-bonded functionalities. Polymerizing on the substrate provides a great deal of flexibility, but this method involves the greatest chance of error and irreproducibility.

Another method of fabricating a cation or anion element is to dissolve uncrosslinked polymers (or those with a relatively small degree of crosslinking), fluors, and crosslink agents in an organic solvent, coat the solar cell, and then dry and crosslink the coating. Alternatives to use of a crosslink agent include subjecting the material to electron bombardment, gamma radiation, or ultraviolet light. A relatively low crosslink density is desirable in order to maximize aqueous diffusion into the polymer, but there must be a sufficient amount of crosslinking so that a coating is insoluble in an aqueous solution to which it is exposed. For example, with divinylbenzene, a crosslink density of 0.5 to 3% is sufficient. An advantage of this method is a well-characterized and highly reproducible coating. Despite steric hindrance efforts, polymer-bound ion exchange moieties bind free ions as tightly as when the moieties are in solution. However, there is a slower rate of uptake in the polymer-bound case because diffusion controls rate of ion contact with the moieties.

A preferred method of making a sensing element is to coat a solar cell with a scintillation polymer dissolved in an organic solvent, dry the polymer, and then subject its surface to functionalization by means of chemical treatment. A scintillation plastic is made by addition of fluors. Scintillation plastics are available from companies such as Kuraray and Bicron Corp.; these are optically clear polymers containing fluors. The common scintillation polymer polyvinyltoluene is not suitable for functionalization because the para position on the phenyl ring is occupied and not available for functionalization. Polymers and copolymers which may be used include polymethyl methacrylate, polystyrene, polyisobutylether, polyethyleneimine, polyvinylalcohol, polyvinylpyridine, polyacrylonitrile and polymethacrylonitrile. Polystyrene and polychloromethylstyrene have proven to be the most versatile and robust materials for chemical functionalization. Functionalization by sulfonation, carboxylation, phosphorylation, and amination each can be achieved in a variety of ways known to those skilled in the art. U.S. Pat. No. 5,466,930, issued Nov. 11, 1995, provides information on functionalization of polymers and ion-exchange materials. U.S. Pat. No. 4,127,499, issued Nov. 28, 1978, provides information on scintillation counting compositions.

An example of use of a detector is to monitor run-off from tailings produced by uranium mining. Contaminants found in these tailings are uranium, thorium, protactinium, and radium. They are transported by surface water and ground water at varying rates dependent on local soil conditions. The cation element of a detector could be comprised of a sulfonated polystyrene, which will concentrate radium, thorium, and protactinium ions. The uranium, in the most likely case where it is present as uranyltricarbonate, $[UO_2(CO_3)_3]^{-4}$, will bind to an anion n element comprised of a quaternary amine polystyrene.

Where it is desired to look for a known contaminant, such as radioactive iodine or americium, a single element detector may be used. This detector would have a sensing element consisting of one solar cell with an appropriate film. For americium, a sulfonated polystyrene may be used as the ion-exchange material. Quaternary amines are suitable surfaces for concentrating iodate and iodide ions. Another example of a single element detector is a monitor for water purification ion-exchange cartridges. The sensing element would be made by functionalizing the polymeric film on a solar cell with a quarternary amine in order to concentrate uranyl ions. A single element sensor assembly does not require a light barrier, but, of course, a meter and a housing are necessary.

What is claimed is:

1. Apparatus for detection of alpha and beta radiation comprising:
   a. a solar cell having a photon-receiving surface and a back surface, where a first electrode is disposed on said photon-receiving surface and a second electrode is disposed on said back surface, and where a current lead is attached to each of said electrodes;

b. a film comprised of optically clear ion-exchanging material covering the photon-receiving surface, where said ion film contains at least one species of scintillation fluor, and where the ion film and said solar cell comprise a sensing element; and c. a housing containing said sensing element, where at least a portion of the ion film is exposed to the atmosphere.

2. The apparatus of claim 1 further including means for measuring output of the solar cell which results from photons illuminating each photon-receiving surface.

3. The apparatus of claim 1 where said ion film will bind cations.

4. The apparatus of claim 1 where said ion film will bind anions.

5. Apparatus for detection of alpha and beta radiation and determination of the oxidation state of alpha-emitting and beta-emitting ions, said apparatus comprising:

a. a first solar cell having a first photon-receiving surface and a back surface, where a first electrode is disposed on said first photon-receiving surface and a second electrode is disposed on said back surface, and where a current lead is attached to each of said electrodes;

b. a film comprised of optically clear cation-exchanging material covering the first photon-receiving surface, where said cation film contains at least one species of scintillation fluor, and where the cation film and said first solar cell comprise a cation element;

c. a second solar cell having a second photon-receiving surface and a back surface, where a third electrode is disposed on said second photon-receiving surface and a fourth electrode is disposed on said back surface, and where a current lead is attached to each of said electrodes;

d. a film comprised of optically clear anion-exchanging material covering the second photon-receiving surface, where said anion film contains at least one species of scintillation fluor, and where the anion film and said second solar cell comprise an anion element;

e. a sensing assembly comprised of said cation element, said anion element, and a light barrier which separates them, where the back surfaces of the elements are adjacent to the light barrier; and f. a housing containing said sensing assembly, where at least a portion of the cation film and at least a portion of the anion film are exposed to the atmosphere.

6. The apparatus of claim 5 further including means for measuring output of each solar cell which results from photons illuminating each photon-receiving surface.

7. The apparatus of claim 5 where the light barrier serves as the second and fourth electrodes.

* * * * *